(12) United States Patent
Heo et al.

(10) Patent No.: US 10,113,119 B2
(45) Date of Patent: Oct. 30, 2018

(54) THERMALLY STABLE MONOLITH CATALYST FOR REFORMING REACTION

(71) Applicant: KOREA RESEARCH INSTITUTE OF CHEMICAL TECHNOLOGY, Daejeon (KR)

(72) Inventors: Il Jeong Heo, Daejeon (KR); Young Woo You, Daejeon (KR); Ji Hoon Park, Pyeongtaek-si (KR); Jung Hyun Park, Gurye-gun (KR); Tae Sun Chang, Daejeon (KR); Beom Sik Kim, Daejeon (KR); Jeong Kwon Suh, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 15/659,261

(22) Filed: Jul. 25, 2017

(65) Prior Publication Data
US 2018/0030357 A1 Feb. 1, 2018

(30) Foreign Application Priority Data

Jul. 27, 2016 (KR) .................. 10-2016-0095541

(51) Int. Cl.
*B01J 23/38* (2006.01)
*B01J 23/70* (2006.01)
(Continued)

(52) U.S. Cl.
CPC .............. *C10G 2/331* (2013.01); *B01J 23/38* (2013.01); *B01J 23/70* (2013.01); *B01J 33/00* (2013.01);
(Continued)

(58) Field of Classification Search
CPC ... B01J 21/06; B01J 23/28; B01J 23/70; B01J 37/00; B01J 37/0215; B01J 37/0236; B01J 37/04; B01J 37/08; B01J 33/00
See application file for complete search history.

(56) References Cited

U.S. PATENT DOCUMENTS 5,139,992 A * 8/1992 Tauster ............... B01D 53/945
                                                    423/213.5
5,532,198 A * 7/1996 Chopin .................... B01J 23/10
                                                    502/303
(Continued)

FOREIGN PATENT DOCUMENTS

KR    10-0719484 B1    5/2007
WO    2014/080220 A1   5/2014

OTHER PUBLICATIONS

Machine translation of KR 10-0749484, 5 pages.

*Primary Examiner* — Cam N. Nguyen
(74) *Attorney, Agent, or Firm* — Medler Ferro Woodhouse & Mills PLLC

(57) ABSTRACT

The present invention relates to a monolith catalyst for reforming reaction, and more particularly, to a thermally stable (i.e. thermal resistance-improved) monolith catalyst for reforming reaction having a novel construction such that any one of Group 1A to Group 5A metals are used as a barrier component in the existing catalyst particles to inhibit carbon deposition occurring during the reforming reaction in a process for formation of a reforming monolith catalyst while improving thermal durability as well as non-activation of the catalyst due to a degradation.

14 Claims, 2 Drawing Sheets

(51) Int. Cl.
*B01J 37/00* (2006.01)
*B01J 37/02* (2006.01)
*B01J 37/04* (2006.01)
*B01J 37/08* (2006.01)
*B01J 33/00* (2006.01)
*B01J 21/06* (2006.01)
*C10G 2/00* (2006.01)
*C01G 25/02* (2006.01)
*C01G 25/04* (2006.01)

(52) U.S. Cl.
CPC ........... *B01J 2229/24* (2013.01); *C01G 25/02* (2013.01); *C01G 25/04* (2013.01); *C10G 2/50* (2013.01)

(56) References Cited

U.S. PATENT DOCUMENTS

| | | | | |
|---|---|---|---|---|
| 6,506,705 B2* | 1/2003 | Blanchard | ................ | B01J 23/10 502/300 |
| 7,166,267 B2* | 1/2007 | Villa | ................ | B01J 23/002 252/373 |
| 7,179,442 B2* | 2/2007 | Hagemeyer | ............... | B01J 23/48 422/105 |
| 7,256,154 B2* | 8/2007 | Moon | ................ | B01J 23/78 502/240 |
| 7,309,480 B2* | 12/2007 | Lomax, Jr. | ............. | B01J 23/002 423/652 |
| 7,473,667 B2* | 1/2009 | Hagemeyer | .......... | B01J 19/0046 502/240 |
| 7,641,875 B1* | 1/2010 | Golden | ................ | B01D 53/945 423/213.5 |
| 7,771,702 B2* | 8/2010 | Eyman | ................ | B01J 21/063 423/652 |
| 8,003,565 B2* | 8/2011 | Hagemeyer | ............... | B01J 23/40 502/240 |
| 8,187,995 B2* | 5/2012 | Wakita | ................ | B01D 53/945 423/593.1 |
| 2016/0151765 A1* | 6/2016 | Kamata | ................ | B01J 23/63 518/711 |

* cited by examiner

THERMALLY STABLE MONOLITH CATALYST FOR REFORMING REACTION

CROSS-REFERENCE TO RELATED APPLICATIONS

This application claims priority to Korean Patent Application No. 10-2016-0095541, filed on Jul. 27, 2016 in the Korean Intellectual Property Office, the entire disclosure of which is incorporated herein by reference.

FIELD OF THE INVENTION

The present invention relates to a monolith catalyst for reforming reaction, and more particularly, to a thermally stable (i.e. thermal resistance-improved) monolith catalyst for reforming reaction having a novel construction, such that any one of Group 1A to Group 5A metals are used as a barrier component for preventing a growth of active particles in the existing catalyst particles to inhibit carbon deposition caused by the growth of catalyst particles occurring during the reforming reaction in a process for formation of a reforming monolith catalyst while improving thermal durability as well as non-activation of the catalyst due to a degradation.

BACKGROUND OF THE INVENTION

Due to a global warming phenomenon, proposals for reduction of greenhouse gas are now releasing in various countries of the world. Among those, the Korean Government has established the goal of 37% decrease in greenhouse gas, compared to the estimated exhaust for 2030, thus increasing a burden on the industry.

As one of the important alternative ideas to reduce the greenhouse gas, using exhausted carbon dioxide as a resource ("resourcing") becomes a more significant topic of conversation, instead of decreasing a carbon dioxide exhaust amount. There are diverse proposals for resourcing carbon dioxide and one of them is to prepare a synthetic gas through a reforming reaction of methane using carbon dioxide. The reforming reaction of methane using carbon dioxide has an advantage such that carbon dioxide and methane as causes of the global warming could be simultaneously eliminated. In addition, compared to other reforming methods, a synthetic gas having a relatively higher content of carbon monoxide ($H_2:CO=1:1$) could be prepared. Therefore, the produced synthetic gas may be used as a reactant in a process for production of high-value added chemical products such as oxoalcohol, dimethyl ether (DME), poly carbonate (PC), acetic acid, etc.

Such a carbon dioxide reforming reaction is a strong endothermic reaction wherein a theoretical maximum conversion rate at a predetermined temperature, that is, an equilibrium conversion rate is increased at a higher temperature, and thus the reaction occurs at a temperature of 650° C. or more, and is generally progressing at a high temperature of 850° C. However, the reaction at the high temperature described above enables catalyst particles to be easily sintered, thus decreasing a point of activation ("activation point") of catalyst, while simultaneously occurring carbon deposition significantly deteriorates catalytic activity. Consequently, it is necessary to develop a reforming catalyst with improved thermal durability.

In particular, although a monolith catalyst capable of processing a great amount of greenhouse gas during the reforming reaction and having high mechanical and thermal durability is required, prior art documents have mostly focused on inventions for improvement of performance of the monolith catalyst.

With regard to a conventional reforming reaction catalyst, Korean Patent Registration No. 10-1480801 proposes a method of manufacturing a monolith catalyst for reforming reaction of methane using carbon dioxide, which includes: mixing and carrying a metal precursor solution with a carrier; coating a monolith support with the mixed and carried solution then drying the same; and calcining the monolith support coated with the mixed and carried solution.

However, the above-described monolith catalyst can maintain high activity for a relatively longer period of time than the existing granular type forming catalysts, thereby enabling production of a stable synthetic gas. Due to structural features of monolith, a pressure loss is relatively low and a reaction at a high flow rate may proceed. However, the above problems, that is, carbon deposition and non-activation of a catalyst due to the degradation under a high temperature reaction condition (800° C. or more) have not yet been overcome.

Further, Korean Patent Registration No. 10-0719484 proposes a catalyst having a water vapor reforming structure, wherein a nickel-based water vapor reforming catalyst containing nickel; alumina; and one or two basic solids selected from a group consisting of magnesium oxide and potassium is applied to and coated on a metal monolith made of iron, stainless steel or iron-chromium-aluminum alloy (Fecralloy).

Korean Patent Laid-Open Publication No. 10-2015-0087341 discloses a sectional-catalyzed substrate monolith which includes a first section and a second section: wherein the first section and second section are arranged in series in an axial direction; and the first section includes a platinum metal carried in a support, and a first base metal oxide selected from a group consisting of iron oxide, manganese oxide, copper oxide, zinc oxide, nickel oxide and a mixture thereof or a first base metal selected from a group consisting of iron, manganese, copper, zinc, nickel and a mixture thereof carried in an inorganic oxide, while the second section includes copper or iron carried in zeolite, and a second base metal oxide selected from a group consisting of iron oxide, manganese oxide, copper oxide, zinc oxide, nickel oxide and a mixture thereof or a second base metal selected from a group consisting of iron, manganese, copper, zinc, nickel and a mixture thereof carried in an inorganic oxide; and the second base metal is different from the first base metal.

Further, Korean Patent Registration No. 10-1038242 discloses an improved catalyst for oxidizing alkane or a mixture of alkane and alkene into corresponding unsaturated carboxylic acid through vapor-phase catalyst oxidation, and in particular, proposes a method for improving performance of a catalyst that includes: at least one element selected from a group consisting of Nb, Ta, W, Ti, Al, Zr, Cr, Mn, Fe, Ru, Co, Rh, Ni, Pt, Ag, Sb, I, B, In and Ce; and a ceramic foam, ceramic monolith or ceramic fabric.

However, these catalysts also have not yet basically solved the above-described problems occurring during the reforming reaction.

SUMMARY OF THE INVENTION

In order to solve the problems entailed in the conventional monolith catalyst for reforming reaction as described above, the present invention is directed to eliminating non-activation of a catalyst due to the degradation such as a decrease in activation points, an occurrence of carbon deposition, etc. caused by sintering a catalyst active metal component used in the existing monolith catalyst during reforming reaction to grow particles.

Accordingly, it is an object of the present invention to provide a new monolith catalyst for reforming reaction, which is capable of preventing non-activation of the catalyst due to carbon deposition and degradation, since a proper amount of any one of Group 1A to 5A metals as a barrier preventing the growth of active particles is used on the catalyst coated on monolith during the reforming reaction.

In order to achieve the above-described object, according to an aspect of the present invention, there is provided a thermally stable monolith catalyst for reforming reaction, including: an active ingredient and Group 1A to 5A metal of barrier components represented by Formula 1 below on a monolith catalyst support, wherein the active ingredient of Formula 1 has 0.5 to 10 parts by weight based on 100 parts by weight of a monolith catalyst.

$$a(X)\text{-}b(Y) \quad \text{[Formula 1]}$$

wherein X is a catalytic active ingredient selected from Co, Ni, Ru, Rh and a mixture thereof, Y is a mixture of Zr as a promoter and Group 1A to 5A metals as a barrier component in a mixing ratio by weight of 1:0.1 to 10, and 'a' and 'b' denote the ratios by weight of X and Y in order, wherein 'a' is 1 and 'b' ranges from 0.2 to 1.5.

According to another aspect of the present invention, there is provided a method for manufacturing a thermally stable monolith catalyst for reforming reaction, including: mixing a metal precursor solution so as to be coincident with a compositional ratio of Formula 1 above; treating an active metal precursor and a barrier component precursor of the metal precursor solution by using at least one of surfactants, organic solvents and water so as to separate an active ingredient and a barrier component from each other; coating a monolith support with the mixed metal precursor solution; drying the monolith support coated with the metal precursor solution; and calcining the dried monolith support at a high temperature.

Further, as another manufacturing method, there is provided a method for manufacturing a thermally stable monolith catalyst for reforming reaction, wherein individual processes of the above manufacturing method are conducted, and an alternative process of adding the active metal and barrier component is further conducted while entirely or partially repeating the previous processes, thereby carrying the catalyst in compositional ratios corresponding to Formula 1 above therein.

According to the present invention, compared to the existing monolith catalyst for reforming reaction, since Group 1A to 5A metals as a barrier component are contained in a form of stable metal or metal oxide, non-activation of a catalyst due to carbon deposition or degradation on the coated catalyst may be considerably prevented. Preferably, as the metal barrier component, at least one selected from Li, Ca, Mg, Ba, Y, La, Er, Pr, Ce, Nd, Sn, B, Al, Ga, In, Si, Sb, Bi, Fe, W and Re is effectively used.

Further, the catalyst according to the present invention may considerably reduce a used amount of catalyst, compared to the existing monolith catalysts.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
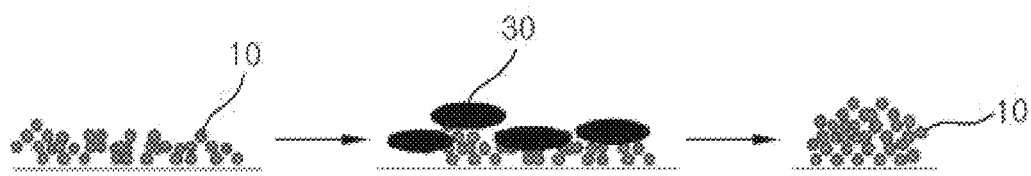
FIG. 1 is a schematic view illustrating carbon deposition and a form of particle growth in regard to existing monolith catalyst.

Hereinafter, embodiments of the present invention will be described in more detail.

With regard to a configuration of the existing monolith catalyst for reforming reaction, the present invention is characterized by preventing an occurrence of carbon deposition and improving thermal durability by mixing Group 1A to 5A metals as a barrier component with a catalyst component coated on a carrier and using the mixed catalyst, thereby noticeably enhancing catalyst efficiency.

The configuration of the catalyst of the present invention has a configuration in which an active ingredient represented by Formula 1 below and a barrier component are carried in a monolith catalyst support.

The preferred configuration of the catalyst of the present invention is characterized by including the component represented by Formula 1 below in a monolith support.

$$a(X)\text{-}b(Y) \quad \text{[Formula 1]}$$

In Formula 1 above, X is a catalytic active ingredient selected from Co, Ni, Ru, Rh and a mixture thereof. More preferably, the catalytic active ingredient is a mixture of Co and Ru. Herein, a mixing ratio of Co and Ru is most preferably in a range of Co:Ru=1:0.2 to 0.01.

Further, in Formula 1 above, Y is a mixture of Zr as a promoter used herein and Group 1A to 5A metals used as a barrier component in a mixing ratio by weight of 1:0.1 to 10, other than the major active material. In this regard, the barrier component is present in a form of metal or metal oxide between particles of the active ingredient and may exhibit a barrier characteristic to block the growth of particles. In other words, more particularly, since a diffusion barrier characteristic is remarkably improved to prevent a sintering phenomenon of an active material, thereby inhibiting non-activation due to carbon deposition and degradation. In addition, since the sintering phenomenon of active ingredient is inhibited, even using a small amount of the catalytic active ingredient, it is possible to exhibit excellent catalytic effects, and thus achieve effects of decreasing an amount of the used catalyst.

The most preferable configuration of the catalyst according to the present invention is to satisfy Formula 1 above, and in order to prevent the degradation of Co—Ru—Zr catalyst, preferably, at least one selected from Li, Ca, Mg, Ba, Y, La, Er, Pr, Ce, Nd, Sn, B, Al, Ga, In, Si, Sb, Bi, Fe, W and Re among Group 1A to 5A metals are further added to Zr in a ratio by weight of 1:0.3-5.0, in particular, most preferably, in an aspect of thermal resistance.

According to a preferable embodiment of the present invention, using the Group 1A to 5A metals as the barrier component described above is an idea of interposing between active particles to prevent the sintering of the active particles, thus being another concept absolutely different from using the same as a constitutional component of a catalyst. Further, the above use is also absolutely different from using the same to increase carrying-binding of a binder or catalyst component to a support such as silica sol and alumina sol.

According to a preferred embodiment of the present invention, a metal salt precursor may be used to provide a function of the Group 1A to 5A metal barrier component. For example, in a case of using Al component as the barrier component, a compound in a form of aluminum salt, more preferably, aluminum nitrate, chloride or organic metal compound may be used.

According to the preferred embodiment of the present invention, the barrier component applied to the catalyst of the present invention may be present in a form of metal or metal oxide in the monolith catalyst while being separated from the active ingredient.

In other words, according to the preferred embodiment of the present invention, the Group 1A to 5A metals contained in the monolith support in the configuration of the catalyst, for example, Al may be present in a form of metal or metal oxide as a barrier film between the catalytic active ingredients, so as to prevent migration between the active materials at a high temperature. Consequently, the sintering phenomenon of the catalytic active ingredient under a high temperature reaction condition may be inhibited. If the Group 1A to 5A metal components such as Al are used in the monolith catalyst for reforming reaction according to the present invention, the sintering phenomenon of the catalyst may be inhibited, and thus the number of activation points is not considerably decreased. Further, the active ingredients may be evenly dispersed to prevent carbon deposition due to the growth of catalytic particles. The above-described effects of the present invention are within another concept absolutely different from the prior art of developing a monolith catalyst for reforming reaction in focusing on performance of the catalyst, in particular, is characterized by improving catalytic effects due to the degradation.

That is, the reforming reaction of methane into carbon dioxide may proceed, for example, according to Reaction Scheme 1 as follows.

$$CH_4+CO_2 \rightarrow 2CO+2H_2, \Delta H_{298}^0 = 247.3 \text{ kJ/mol} \quad \text{[Reaction Scheme 1]}$$

This reaction is a very strong endothermic reaction, wherein a theoretical maximum conversion rate at a predetermined temperature, that is, an equilibrium conversion rate may be increased as the temperature becomes higher, thus to occur a reaction at a temperature of 650° C. or more, and generally, progress the reaction at a high temperature of 850° C. However, this reaction involves a high ratio of carbon to hydrogen in a reaction gas and has a characteristic of easily generating carbon in a thermodynamic aspect, thereby occurring non-activation due to generation and sintering of cokes. On the other hand, according to a preferred configuration of the present invention, the barrier component dispersed and contained between the catalytic active ingredients, preferably, at least one basic barrier particle selected from Li, Ca, Mg, Ba, Y, La, Er, Pr, Ce, Nd, Sn, B, Al, Ga, In, Si, Sb, Bi, Fe, W or Re may prevent carbon deposition, and the growth of particles due to agglomeration of catalytic components, and thereby suppressing non-activation of the catalyst.

Further, according to the preferred embodiment of the present invention, when the Group 1A to 5A metals are mixed and used together with Zr in a mixing ratio of 1:0.1 to 10, the above problems such as the sintering phenomenon and non-activation of the catalyst due to carbon deposition and degradation may be considerably inhibited. In particular, since effects of the catalytic active ingredient are maximized, even using a very small amount of the catalytic component about 1/10 to 1/100 times that in prior art, substantially the same catalytic effects may be achieved. Also, in this regard, compared to the existing methods, noticeably superior and unexpected effects may be accomplished. Accordingly, it is construed that the barrier particles are evenly distributed between the catalytic active ingredients, thus to maximize activity of the catalyst.

According to the present invention, if a content of the barrier particles is too small, carbon deposition occurs due to the sintering of active ingredients, and non-activation of the catalyst occurs due to the degradation, hence making it impossible to accomplish the object of the present invention. On the other hand, if the content of the barrier particles is excessive, the number of relative catalytic active metals may be decreased to cause a deterioration in catalytic activity.

According to the preferred embodiment of the present invention, the metal components represented by Formula 1 above are evenly dispersed in the monolith support and the monolith support used herein may include, for example, a monolith support composed of ceramic, silicon carbide or metal components having a low specific surface area of 10 m$^2$/g or less. Such a monolith support preferably has a honeycomb structure.

Further, according to the preferred embodiment of the present invention, the barrier particle used herein may include a mixture of one or two or more selected from Group 1A to 5A metals, most preferably, at least one Group 1A to 5A metals selected from Li, Ca, Mg, Ba, Y, La, Er, Pr, Ce, Nd, Sn, B, Al, Ga, In, Si, Sb, Bi, Fe, W and Re, and Al is desirably used.

Then, a method for manufacturing a monolith catalyst according to the present invention will be described below.

According to a preferred embodiment of the present invention, a metal precursor solution is mixed to reach a compositional ratio coincident with that of Formula 1 above. More particularly, the mixing is a process of mixing individual metal precursor solutions, in order to form a barrier including: at least one active metal catalytic component selected from cobalt (Co), ruthenium (Ru), nickel (Ni) and rhodium (Rh); zirconium (Zr); and, for example, at least one selected from Li, Ca, Mg, Ba, Y, La, Er, Pr, Ce, Nd, Sn, B, Al, Ga, In, Si, Sb, Bi, Fe, W and Re.

According to the preferred embodiment of the present invention, any alternative binder or powder support is not used in the mixing process of the metal precursor solutions as described above. Therefore, the monolith catalyst according to the present invention is characterized in that any specific powder support component such as silica ($SiO_2$) and alumina ($Al_2O_3$) is not contained.

According to the preferred embodiment of the present invention, for example, a cobalt compound as a cobalt precursor may be $Co(NO_3)_2$, a ruthenium precursor may be $Ru(NO)(NO_3)_3$, a nickel compound as a nickel precursor may be $Ni(NO_3)_2$, a rhodium precursor may be $Rh(NO_3)_3$, a zirconium compound as a zirconium precursor may be $ZrCl_2O$, and the barrier component may include an alumina precursor such as a salt type compound, for example, $Al(NO_3)_2$.

According to the preferred embodiment of the present invention, the active metal precursor and the barrier component precursor as described above may be subjected to a process of using at least one selected from surfactants, organic solvents and water to separate the active ingredient and the barrier component from each other. This process is required for maximizing effects of adding the barrier component.

According to the present invention, particular examples of the surfactant useable for separating the catalytic active particles and the barrier particles may include cetyltrimethylammonium bromide (CTAB), myristyltrimethylammonium bromide, Dodecyltrimethylammonium bromide, Bis(p-sulfonatophenyl)phenylphosphine dihydrate dipotassium salt, Citric acid, Polyethylene glycol (PEG), Oleic acid, etc. Further, the organic solvent used herein may include any typical organic solvent, and for example, alcohol or organic acid.

According to the present invention, the mixed metal precursor solution may be subjected to a process of coating a monolith support with the solution.

Next, the monolith support coated with the metal precursor solution is dried. Herein, the drying may include, for example, drying the coated monolith support in an oven at 110° C. for about 1 hour.

According to the present invention, the dried monolith support is subjected to calcination at a high temperature, for example, by calcining the monolith support at about 300 to 900° C. for 4 to 12 hours, so as to produce a monolith catalyst.

According to the preferred embodiment of the present invention, a method of introducing another barrier component may be adopted, in order to carry a desired amount of catalyst in monolith by repeating the above processes. That is, individual processes of the above manufacturing method are conducted, and on the other hand, an alternative process of adding the active metal and barrier component may be further included while entirely or partially repeating the previous processes, thereby carrying the catalyst in compositional ratios corresponding to Formula 1 above therein.

According to the preferred embodiment of the present invention, in order to preferably introduce the barrier component for example, the monolith support may be coated with a low concentration active metal precursor solution and subjected to the same drying and calcining processes as described above. Thereafter, the catalyst-coated monolith may undergo recoating with the barrier precursor solution, drying and calcining the same, so as to manufacture a catalyst in which the catalytic active ingredient and the barrier component are coated and calcined in a separated form.

As such, in a case of the manufactured monolith catalyst according to the present invention, even using the catalytic component in a lower amount of several tens of times that the existing catalysts, catalytic activity substantially equal to that achieved by such existing catalysts may be exhibited. Further, the non-activation problem due to the carbon deposition and degradation may be prevented.

FIG. 1 is a schematic view illustrating carbon deposition when using the existing monolith catalyst and a sintering phenomenon (particle growth) shown at a high temperature. Herein, FIG. 1 shows that, since the barrier particle, for example, Al component is not used, the carbon deposition and the sintering phenomenon to grow particles are noticeably expressed over a use time.

Figure 2:
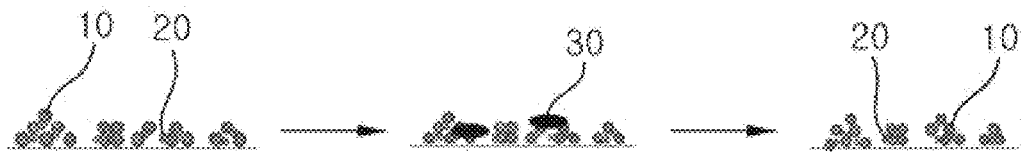
FIG. 2 is a schematic view illustrating carbon deposition and a form of inhibited particle growth in regard to the monolith catalyst according to the present invention.

On the other hand, FIG. 2 is a schematic view illustrating the monolith catalyst according to the present invention and showing that, since the Group 1A to 5A metals, for example, Al component as the barrier component is contained between the catalytic active ingredients, the carbon deposition almost does not occur during an operation, and the sintering phenomenon does not occur while maintaining a distribution of the catalytic active particles without a change even when the catalyst is used for a long period of time at a high temperature.

Referring to FIGS. 1 and 2, large catalyst particles 10 are catalytic active material particles and Zr particles, while small particles 20 are Al particles of the barrier component in a form of metal or metal oxide. Further, a black elliptical material indicates deposited carbon 30.

Hereinafter, the present invention will be described in more detail by examples, however, it is not particularly limited thereto.

EXAMPLES

Examples 1 to 5 and Comparative Example 1

With different ratios shown in Table 1 below, constitutional components of a catalyst such as Co, Ru, Zr, a barrier, that is, Al precursor, and a surfactant were mixed together. Precursors of individual components are as follows.

Cobalt nitrate hexahydrate ($Co(NO_3)_2 \cdot 6H_2O$, Samchun Chem, 97%), Ruthenium nitrosyl nitrate ($Ru(NO)(NO_3)_3$, Stream Chem, 99%), Zirconium chloride oxide octahydrate ($ZrCl_2O \cdot 8H_2O$, Junsei, 99%), Aluminum nitrate enneahydrate ($Al(NO_3)_3 \cdot 9H_2O$, Junsei, 98%), Cetyl trimethylammonium bromide (CTAB).

After coating the monolith support with the above solution, the support was dried in an oven at a temperature of about 110° C. for about 1 hour. Such coating-drying processes were repeated several times to produce a catalyst including 0.9 wt. % or more of catalytic component in terms of a ratio by weight. The catalytic component-coated monolith support was calcined at a temperature of 400° C. for 6 hours. In an additional Al barrier carrying process, this process was repeated during the drying process or after the calcination, to produce a monolith catalyst for reforming reaction according to the present invention.

Experimental Example

In order to assess stability against degradation of the monolith catalyst, an extent of sintering the catalytic active material was determined through CO chemisorption after performing heat treatment at 1000° C. for 24 hours. As shown in the following Table 1, in a case of the monolith catalyst including Al added as a barrier, it could be seen that CO adsorption quantity indicating the number of activation points is 5 to 12 times higher than the monolith catalyst without Al addition (Comparative Example 1). Furthermore, a dispersion rate of active ingredients was also found to be 6 to 14 times higher than Comparative Example 1.

Figure 3:
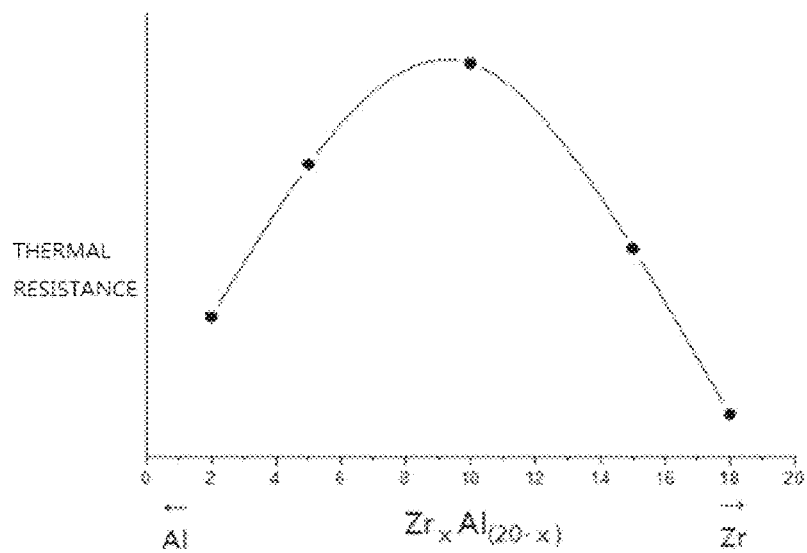
FIG. 3 is a graph showing observed results of a change in thermal resistance of C—R—Z-A catalyst along a change in a content of Al to Zr when Al particles among Group 1A to 5A metals are added to C—R—Z catalyst in an embodiment of the present invention.
Figure 4:
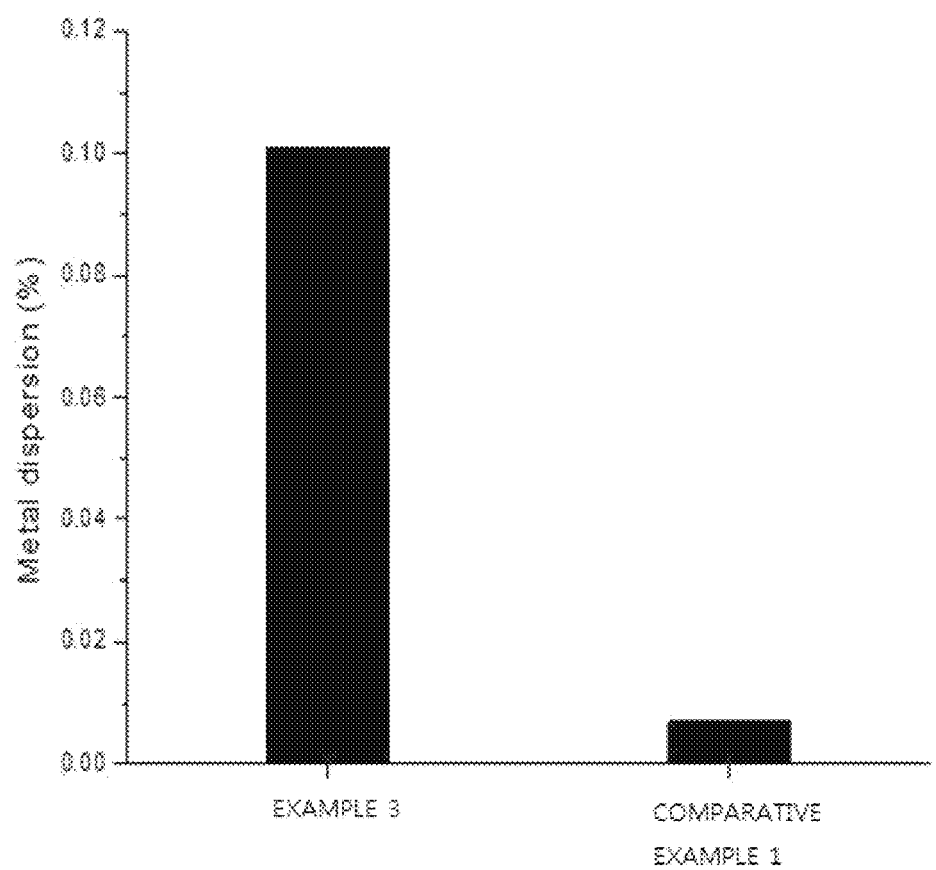
FIG. 4 illustrates compared results of dispersion rates of CRZ components after heat treatment between catalysts of Example 3 according to the present invention and Comparative Example 1.

In particular, at a molar ratio of Zr to Al of 1:1, the largest CO adsorption quantity and the highest metal dispersion rate were observed, thereby indicating that, due to the degradation, the most stable addition ratio of the barrier may be denoted by Zr:Al=1:1. This result could be demonstrated by the graph of FIG. 3 illustrating a change in thermal resistance of C—R—Z-A catalyst along a change in a content of Al to Zr when Al particles are added to C—R—Z catalyst, and the graph of FIG. 4 illustrating compared results between the catalysts of Example 3 according to the present invention and C—R—Z catalyst used for dry reforming.

TABLE 1

| Category | Component and compositional ratio Y (mol %) | | CO cumulative quantity (cm³/g) after heat treatment | Metal dispersion after heat treatment (%) |
|---|---|---|---|---|
| | Zr | Al | | |
| Example 1 | 1.78 | 16.02 | 0.134 | 0.052 |
| Example 2 | 4.45 | 13.35 | 0.215 | 0.080 |
| Example 3 | 8.90 | 8.90 | 0.272 | 0.101 |
| Example 4 | 13.35 | 4.45 | 0.168 | 0.062 |
| Example 5 | 16.02 | 1.78 | 0.104 | 0.041 |
| Comparative Example 1 | 17.8 | 0 | 0.022 | 0.007 |

In a(X)-b(Y) of Formula 1, X is a combined component of Co and Ru, its ratio being 81.8, 0.4 mol %, respectively, relative to a total sum of X and Y coponents, and carried in a monolith carrier until the total sum of X and Y components reaches 0.9 wt %.

DESCRIPTION OF REFERENCE NUMERALS

10: catalyst (CRZ) particle
20: barrier (Al) particle
30: deposited carbon

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

What is claimed is:

1. A thermally stable monolith catalyst for reforming reaction, comprising:
an active ingredient and Group 1A to 5A metal of barrier components represented by Formula 1 below on a monolith catalyst support, wherein the active ingredient of Formula 1 has 0.5 to 10 parts by weight based on 100 parts by weight of a monolith catalyst, $$a(X)\text{-}b(Y) \qquad \text{Formula 1}$$

wherein X is a catalytic active ingredient selected from Co, Ni, Ru, Rh and a mixture thereof, Y is a mixture of Zr as a promoter and Group 1A to 5A metals as a barrier component in a mixing ratio by weight of 1:0.1 to 1:10, and 'a' and 'b' denote the ratios by weight of X and Y in order, wherein 'a' is 1 and 'b' ranges from 0.2 to 1.5.

2. The thermally stable monolith catalyst according to claim 1, wherein Y is a barrier component including Zr and the Group 1A to 5A metals mixed in a ratio by weight of 1:0.3 to 1:5.0.

3. The method according to claim 2, wherein the Group 1A to 5A metals are present in a form of metal or metal oxide while being separated from the catalytic active ingredient.

4. The thermally stable monolith catalyst according to claim 1, wherein the Group 1A to 5A metal barrier particles include at least one component selected from Li, Ca, Mg, Ba, Y, La, Er, Pr, Ce, Nd, Sn, B, Al, Ga, In, Si, Sb, Bi, Fe, W and Re.

5. The method according to claim 4, wherein the Group 1A to 5A metals are present in a form of metal or metal oxide while being separated from the catalytic active ingredient.

6. The thermally stable monolith catalyst according to claim 1, wherein the Group 1A to 5A metals are present in a form of metal or metal oxide while being separated from the catalytic active ingredient.

7. The thermally stable monolith catalyst according to claim 1, wherein the monolith support consists of ceramic, silicon carbide or metal component having a specific surface area of 10 m²/g or less.

8. A method for manufacturing a thermally stable monolith catalyst for reforming reaction, comprising:
mixing a metal precursor solution so as to be coincident with a compositional ratio of Formula 1 below;
treating an active metal precursor and a barrier component precursor using at least one of surfactants, organic solvents and water so as to separate an active ingredient and a barrier component from each other;
coating a monolith support with the mixed metal precursor solution;
drying the monolith support coated with the metal precursor solution; and
calcining the dried monolith support at a high temperature, $$a(X)\text{-}b(Y) \qquad \text{Formula 1}$$

wherein X is a catalytic active ingredient selected from Co, Ni, Ru, Rh and a mixture thereof, Y is a mixture of Zr as a promoter and Group 1A to 5A metals as a barrier component in a mixing ratio by weight of 1:0.1 to 1:10, and 'a' and 'b' denote the ratios by weight of X and Y in order, wherein 'a' is 1 and 'b' ranges from 0.2 to 1.5.

9. The method according to claim 8, wherein the Group 1A to 5A metal barrier precursor is a compound in a salt form.

10. The method according to claim 8, wherein the high temperature calcination in the calcining process at a high temperature is executed at 300 to 900° C. for 4 to 12 hours.

11. A method for manufacturing a thermally stable monolith catalyst for reforming reaction, comprising:
mixing a metal precursor solution so as to be coincident with a compositional ratio of Formula 1 below;
treating an active metal precursor and a barrier component precursor using at least one of surfactants, organic solvents and water so as to separate an active ingredient and a barrier component from each other;
coating a monolith support with the mixed metal precursor solution;
drying the monolith support coated with the metal precursor solution;
calcining the dried monolith support at a high temperature; and
further adding the active metal ingredient and the barrier component while entirely or partially repeating the above processes, so as to carry the monolith catalyst corresponding to the compositional ratio of Formula 1, $$a(X)\text{-}b(Y) \qquad \text{Formula 1}$$

wherein X is a catalytic active ingredient selected from Co, Ni, Ru, Rh and a mixture thereof, Y is a mixture of Zr as a promoter and Group 1A to 5A metals as a barrier component in a mixing ratio by weight of 1:0.1 to 1:10, and 'a' and 'b' denote the ratios by weight of X and Y in order, wherein 'a' is 1 and 'b' ranges from 0.2 to 1.5.

12. The method according to claim 11, wherein the active metal precursor and the barrier component precursor are treated using at least one substance selected from surfactants, organic solvents and water so as to separate the active ingredient and the barrier component from each other, and the follow-up processes include: coating the monolith support with a low concentration active metal precursor solution; drying and calcining the same; re-coating the catalyst-coated monolith with the barrier precursor solution; and drying and calcining the same, so as to coat and calcine the catalyst active ingredient and the barrier component in a separated form.

13. The method according to claim 11, wherein the Group 1A to 5A metal barrier precursor is a compound in a salt form.

14. The method according to claim 11, wherein the high temperature calcination in the calcining process at a high temperature is executed at 300 to 900° C. for 4 to 12 hours.

* * * * *

UNITED STATES PATENT AND TRADEMARK OFFICE
CERTIFICATE OF CORRECTION

PATENT NO. : 10,113,119 B2
APPLICATION NO. : 15/659261
DATED : October 30, 2018
INVENTOR(S) : Il Jeong Heo et al.

Page 1 of 1

It is certified that error appears in the above-identified patent and that said Letters Patent is hereby corrected as shown below:

In the Claims

Column 9, Line 49 (Claim 1): "Yin" should be replaced with --Y in--.

Column 10, Line 27 (Claim 8): "Yin" should be replaced with --Y in--.

Column 10, Line 59 (Claim 11): "Yin" should be replaced with --Y in--.

Signed and Sealed this
Eleventh Day of December, 2018

Andrei Iancu
*Director of the United States Patent and Trademark Office*